Feb. 20, 1940.　　　W. P. TORRINGTON　　　2,190,689
PROCESS AND APPARATUS FOR TREATING YEAST
Filed May 11, 1939
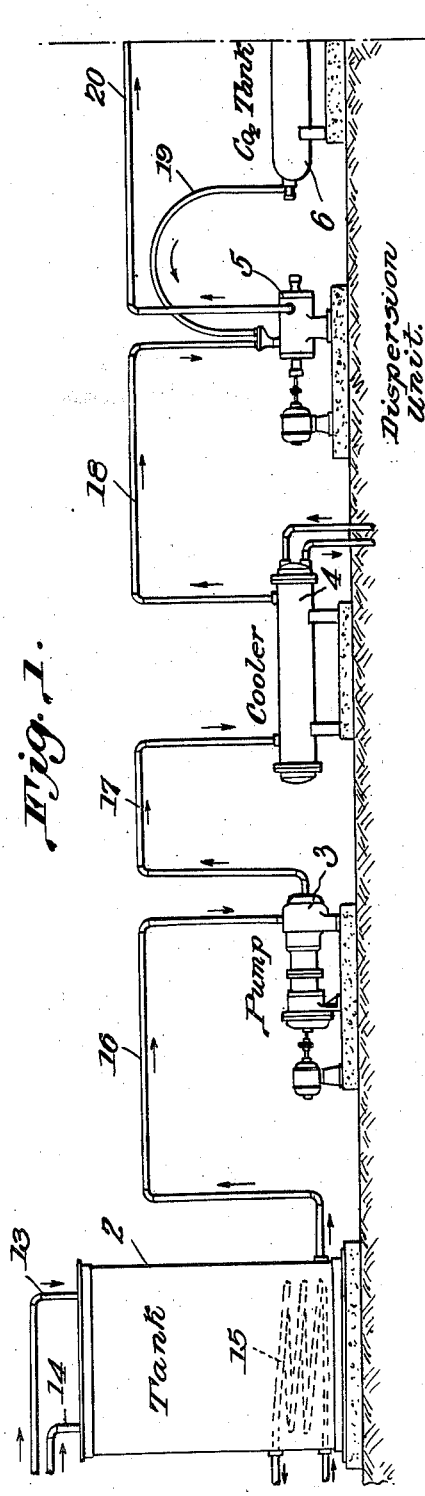
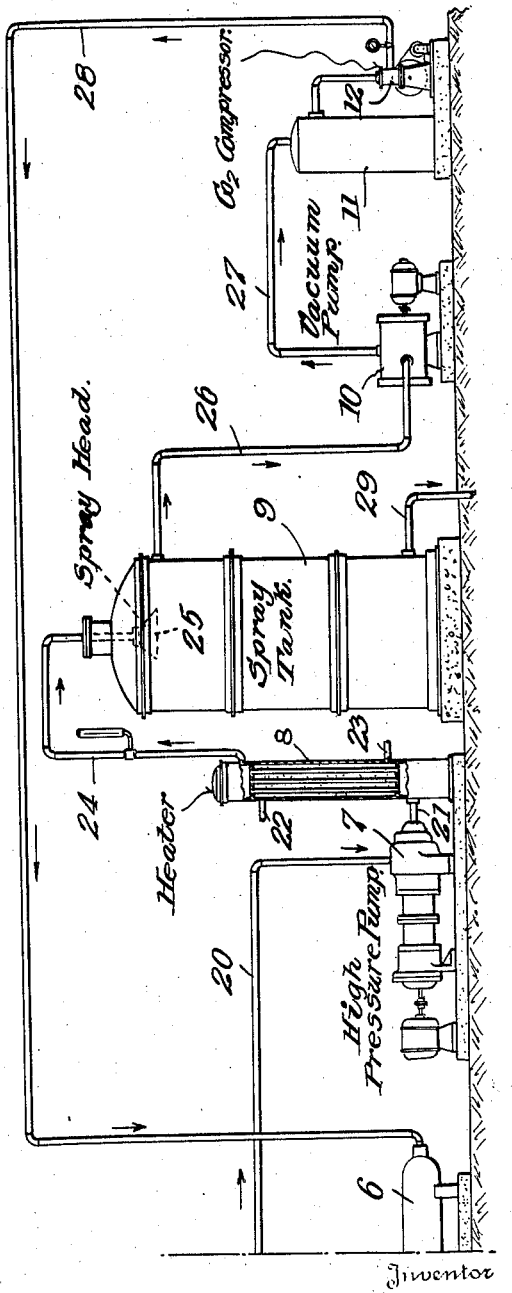
Inventor
W. P. Torrington,
By Seymour, Bright & Nottingham
Attorneys

UNITED STATES PATENT OFFICE 2,190,689

PROCESS AND APPARATUS FOR TREATING YEAST

William P. Torrington, New York, N. Y., assignor to Emulsions Process Corporation, New York, N. Y., a corporation of Delaware Application May 11, 1939, Serial No. 273,078

8 Claims. (Cl. 195—66)

This invention relates to the treatment of yeast and more particularly to a novel method of breaking down yeast cells to release the enzymes contained therein.

In the brewing of beer there is obtained as a by-product, approximately three pounds of yeast for every barrel of beer produced, which under present day practice is only utilized to a very limited extent, and may therefore be considered a waste product. It has long been recognized that such yeast is of value if it could be treated to obtain the highly active liquid yeast contained within the hemicellulose yeast cells. This would provide a yeast concentrate containing the vitamins present within the yeast cell.

Many methods have been proposed and tried, to crack these yeast cells and among them I may mention the use of colloidal mills, ball mills and various combinations of pressure and vacuum. The mechanical means of cracking yeast have proved very unsatisfactory because of the minute size of the yeast cells and their elasticity, making it extremely difficult to rupture the comparatively tough cell walls.

Liquid containing such yeast has also been subjected to high pressure and then discharged through an orifice into a vacuum.

While such methods have worked to a very limited extent, the number of cells broken down has been extremely small.

In the colloidal machines in which attrition is utilized, the mechanical heat developed is so high that the yeast is killed and the only benefit secured is the recovery of the vitamins which are thermo stable.

The process employing high pressure and discharge through a nozzle has not operated efficiently due to the fact that the liquid within the yeast cells and the surrounding water is practically incompressible so the only action obtained from the discharge through the nozzle is mechanical atomization.

The primary purpose of the present invention is to provide a method of cracking yeast cells which is entirely practical and which eliminates the objections to the prior proposals.

Another object is to supply a simple and inexpensive apparatus for this purpose and yet one which will be exceedingly effective for the purpose for which it is designed.

With the foregoing objects outlined and with other objects in view which will appear as the description proceeds, the invention consists in the novel features hereinafter described in detail, illustrated in the accompanying drawing and more particularly pointed out in the appended claims.

In the drawing:

Fig. 1 is a side elevation of the first portion of the apparatus.

Fig. 1a is a similar view of the second portion of the apparatus with a part in section to facilitate illustration.

Referring to the drawing, 2 designates a tank, 3 a pump, 4 a cooler, 5 a dispersion unit or emulsifying mill, 6 a storage tank for $CO_2$, 7 a high pressure pump, 8 a tubular type heater, 9 a spray tank, 10 a vacuum pump, 11 a $CO_2$ tank, and 12 a compressor.

The yeast to be treated is introduced into the tank 2 through a pipe 13 and in this tank it is mixed with a suitable nutrient, introduced through the pipe 14. A heating coil 15 is used in this tank to maintain a temperature suitable to speed the activation of fermentation.

After the yeast is activated, it is drawn through the pipe 16 by the pump 3 and is put under a pressure of about 100 pounds per square inch before it is forced by the pump through a pipe 17 into the cooler 4 where its temperature is reduced to about 33° F.

From the cooler, the material is conducted by a pipe 18 to the dispersion mill 5 which is preferably of the type disclosed in the application of M. W. Ditto, Serial No. 218,883, filed July 12, 1938. As it enters the dispersion unit it is mixed with $CO_2$ which is passed from the tank 6 to the inlet of the dispersion mill by means of a pipe 19. In the mill the $CO_2$ gas is finely dispersed in the liquid mass and the mixture is discharged from the mill through a pipe 20 that conveys the same to the high pressure pump 7 which raises the pressure of the mixture to a pressure of the order of 3,000 pounds per square inch, before the mixture travels through a pipe 21 into one end of the tubular heater 8. In passing through the heater the material is raised in temperature to approximately 120° F. by any suitable heating medium introduced into the heater at 22 and discharged at 23.

After heating, the material travels through a pipe 24 terminating in a spray head 25 arranged in the tank 9. As the interior of the tank is maintained under subatmospheric pressure, the $CO_2$ will be released from the mixture and will be withdrawn by the vacuum pump 10 through a pipe 26 which forces such gas through a pipe 27 into the tank 11. It is withdrawn from the latter by means of the compressor 12, which places it under a pressure in excess of 100 pounds per square inch so that it may be returned to the tank 6 through the pipe 28 and be passed from the tank 6 into the dispersion unit 5.

From the tank 9 the yeast may be withdrawn through a pipe 29 and passed to filters, evaporators, etc.

In one method of operation, I take the waste yeast from a beer-making process or the like, and thoroughly wash it to separate the foreign matter, using antiseptic solution if necessary to kill bacteria. Any suitable bactericide may be used for this purpose, for example, ammonium persulfate, one pound of which may be used for each 75 pounds of yeast to be washed, along with about 7½ gallons of cold water. The yeast is usually allowed to stand in this solution overnight, after which it is decanted. Ordinarily the yeast is allowed to stand after washing, and after decanting, the watery mass will be a very thick mass consisting of about 80% water and 20% dry yeast. Water is added to this mass so that the percentage of dry yeast is reduced to approximately 10% before treatment is started.

The temperature of this watery mass is brought to about 55° F. and then in the tank 2 (or before entering this tank) it is mixed with sufficient sterile wort to act as a nutrient and cause the yeast cells to immediately swell and start formation of alcohol and $CO_2$. When this activity has continued until all the yeast is active, I pump this yeasty liquid by the pump 3 through the cooler 4 under a pressure of about 100 pounds per square inch, and introduce it under this pressure into the dispersion unit at a temperature of about 32° F. $CO_2$ is introduced into the unit along with the yeast liquor and due to the action of the mill, is finely dispersed throughout the liquid. In the mill the temperature of the mass is maintained at approximately 32° F.

The carbonated and activated yeast solution is then raised in pressure, ranging between 1000 and 3000 pounds per square inch, and afterwards its temperature is brought up to about 120° F. which is sufficient to completely convert the carbonic acid to $CO_2$. The mixture is then discharged through the spray head 25 into the tank 9 which is under atmospheric pressure or vacuum. The action is three-fold. The finely atomized gas contained in the liquid being released from relatively high superatmospheric pressure to a much lower pressure, causes a very violent mechanical atomization; a certain portion of the $CO_2$ due to the high pressure has penetrated the yeast cells and with the $CO_2$ from the action within the yeast cells themselves, by the addition of a nutrient, causes the yeast cells to be ruptured, due to the explosive expansion of the gas contained therein. The $CO_2$ is then pumped from the top of the discharge chamber 11 and can be recycled.

The liquid containing the cracked yeast is then filtered to eliminate the solid matter which consists of hemicellulose yeast cells and is then concentrated under vacuum to a desired degree.

The reaction is further aided by the weakening of the cells due to the activity that takes place when food is supplied to dormant yeast.

From the foregoing it is believed that my method of procedure and novel apparatus may be clearly understood by those skilled in the art, and I am aware that changes may be made in the specific steps of the method and in the details of the apparatus without departing from the spirit of the invention as expressed in the claims.

What I claim and desire to secure by Letters Patent is:

1. In a method of the character described, maintaining yeast in contact with a nutrient for a sufficient period of time and at a suitable temperature to cause the yeast cells to swell and form gas within themselves, subjecting such material in an aqueous solution to high pressure, then suddenly releasing the pressure and thereby causing the yeast cells to explode, and then separating the released $CO_2$ from the remaining liquid mass.

2. In a method of the character described, subjecting an aqueous solution of active yeast to carbonation by dispersing a sufficient amount of $CO_2$ within the solution so that an excess of gas is present, subjecting the carbonated solution to high superatmospheric pressure and increasing the temperature of the solution to a temperature of the order of 120° F., then suddenly releasing the pressure on the solution and thereby releasing the $CO_2$ and rupturing the yeast cells, and subsequently separating the $CO_2$ from said solution.

3. In a method of the character described, subjecting an aqueous solution of active yeast to dispersion in combination with $CO_2$ under superatmospheric pressure, increasing the pressure of the resulting mixture to a pressure between approximately 1000 and 3000 pounds per square inch and raising the temperature of the mixture to a temperature of the order of 120° F., then suddenly releasing such pressure whereby $CO_2$ is released from the mixture and the yeast cells are cracked, and then separating the $CO_2$ from the yeasty mass.

4. In a method of the character described, mixing yeast with a nutrient and thereby producing yeast in aqueous solution, placing said solution under superatmospheric pressure and finely dispersing $CO_2$ in the solution while the latter is maintained at a temperature of substantially 32° F., then increasing the pressure of the mixture to a pressure above 1000 pounds per square inch and raising the temperature of the mixture to the order of about 120° F., then suddenly releasing the pressure on the mixture and thereby releasing the $CO_2$ from the mixture and cracking the yeast cells, and finally separating the $CO_2$ from the remaining yeasty solution.

5. In a method of the character described, activating a yeasty solution and then placing the solution under a superatmospheric pressure of the order of 100 pounds per square inch and under a temperature of about 32° F., then suddenly dispersing $CO_2$ throughout the solution while it is maintained under approximately said pressure and temperature, then increasing the pressure and temperature of the resulting mixture, and subsequently discharging the mixture into a chamber maintained under substantially atmospheric pressure and thereby releasing the $CO_2$ and cracking the yeast cells.

6. In a method of the character described, activating a yeasty solution and then placing the solution under a superatmospheric pressure of the order of 100 pounds per square inch and under a temperature of about 32° F., then suddenly dispersing $CO_2$ throughout the solution while it is maintained under approximately said pressure and temperature, then increasing the pressure and temperature of the resulting mixture, subsequently discharging the mixture into a chamber maintained under substantially atmospheric pressure and thereby releasing the $CO_2$ and cracking the yeast cells, and recycling the $CO_2$ to the dispersion step from said chamber.

7. In a method of the character described, maintaining yeast in contact with a nutrient for a sufficient period of time and under a suitable temperature until all the yeast is activated, then placing the resulting aqueous mass under superatmospheric pressure and passing the same through a dispersion chamber, finely dispersing $CO_2$ throughout the mass in said chamber while the mass is maintained at a temperature of about 32° F., then increasing the superatmospheric pressure on the resulting mixture and raising the temperature of the mixture to about 120° F., then releasing the pressure and introducing the mass into a chamber maintained under substantially atmospheric pressure whereby the yeast cells are cracked and the $CO_2$ is released, and finally separating the $CO_2$ from the mass.

8. An apparatus of the character described, comprising means for placing an aqueous solution of active yeast under superatmospheric pressure and a relatively low temperature, a dispersion mill, means for introducing the solution into said mill, a $CO_2$ storage tank, a conduit for conveying $CO_2$ from said tank to the dispersion mill, a high pressure pump, a conduit for conveying a carbonated mixture of such solution from the dispersion mill to the high pressure pump, a conduit for conveying the mixture from the pump and terminating in a spray head, a heater interposed in said conduit, a tank in which the spray head is arranged, means for discharging gas from the upper portion of the tank, and means for discharging a liquid mass from the lower portion of the tank.

WILLIAM P. TORRINGTON.